United States Patent
Niino

(10) Patent No.: US 9,695,355 B2
(45) Date of Patent: Jul. 4, 2017

(54) PRODUCTION METHOD OF THERMOPLASTIC RESIN COMPOSITION, MOLDED BODY, AND LIGHT EMISSION BODY

(71) Applicant: MITSUBISHI RAYON CO., LTD., Tokyo (JP)

(72) Inventor: Hiroshi Niino, Otake (JP)

(73) Assignee: MITSUBISHI RAYON CO., LTD., Tokyo (JP)

(*) Notice: Subject to any disclaimer, the term of this patent is extended or adjusted under 35 U.S.C. 154(b) by 0 days.

(21) Appl. No.: 14/887,491

(22) Filed: Oct. 20, 2015

(65) Prior Publication Data

US 2016/0040062 A1 Feb. 11, 2016

Related U.S. Application Data

(62) Division of application No. 13/504,492, filed as application No. PCT/JP2010/068957 on Oct. 26, 2010, now Pat. No. 9,200,123.

(30) Foreign Application Priority Data

Oct. 28, 2009 (JP) .................. 2009-247283
Jan. 6, 2010 (JP) .................. 2010-001247

(51) Int. Cl.
C09K 11/06 (2006.01)
C08J 3/20 (2006.01)
(Continued)

(52) U.S. Cl.
CPC ............... *C09K 11/06* (2013.01); *C08J 3/201* (2013.01); *C08J 3/203* (2013.01); *C08K 5/0091* (2013.01); *C08K 5/07* (2013.01); *C09K 2211/186* (2013.01)

(58) Field of Classification Search
CPC .......... C09K 11/06; C08J 3/201; C08J 3/203; C08K 5/0091; C08K 5/07
See application file for complete search history.

(56) References Cited

U.S. PATENT DOCUMENTS

| 8,889,785 B2 | 11/2014 | Niino et al. |
| 2007/0225409 A1 | 9/2007 | Matsumoto |
| 2009/0281234 A1 | 11/2009 | Ando |

FOREIGN PATENT DOCUMENTS

| CN | 101072816 | 11/2007 | |
| EP | 0400703 | * 5/1990 | ............ C09J 167/00 |

(Continued)

OTHER PUBLICATIONS

Machine translation of JP 10-072552. Mar. 1998.*
(Continued)

*Primary Examiner* — John Uselding
(74) *Attorney, Agent, or Firm* — Oblon, McClelland, Maier & Neustadt, L.L.P.

(57) ABSTRACT

Disclosed is a production method of a thermoplastic resin composition comprising: compounding 0.001 to 50 parts by mass of a metal complex (B) with respect to 100 parts by mass of a thermoplastic resin (A), and kneading it under a condition of a kneading temperature of 225 to 300° C. and of a kneading time of 0.5 to 20 minutes, wherein a metal of the metal complex (B) is a metal except for zinc; a molded body obtained by molding the thermoplastic resin composition which is obtained by the production method; and a light emission body using the molded body.

5 Claims, 1 Drawing Sheet

(51) Int. Cl.
*C08K 5/00* (2006.01)
*C08K 5/07* (2006.01)

(56) References Cited

FOREIGN PATENT DOCUMENTS

| | | |
|---|---|---|
| JP | 43 27489 | 11/1968 |
| JP | 3 24176 | 2/1991 |
| JP | 10-072552 | 3/1998 |
| JP | 10 278065 | 10/1998 |
| JP | 2006 137843 | 6/2006 |
| JP | 2008-101085 | 5/2008 |
| JP | 2009 24081 | 2/2009 |
| WO | 2005 085358 | 9/2005 |

OTHER PUBLICATIONS

International Search Report Issued Nov. 22, 2010 in PCT/JP10/68957 Filed Oct. 26, 2010.
Office Action issued Jan. 3, 2014, in Chinese Patent Application No. 201080047952.9 (w/ English-and Japanese translations).
Database WPI, Week 199821, Thomson Scientific, London, GB, AN 1998-234791 XP002693362, 1998.
Supplementary Search Report issued Mar. 18, 2013, in European patent application No. 10826713.9.

\* cited by examiner

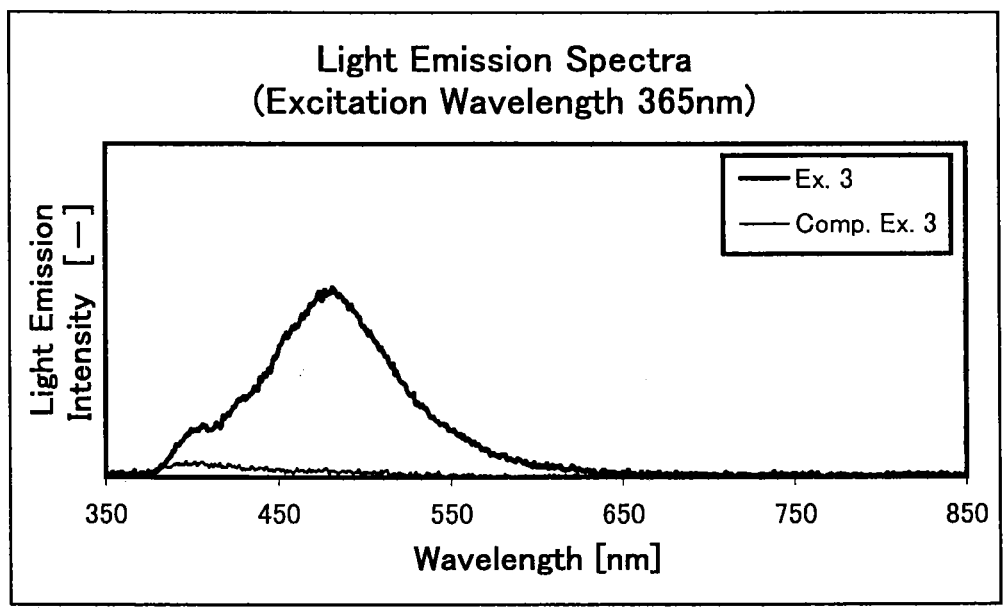

PRODUCTION METHOD OF THERMOPLASTIC RESIN COMPOSITION, MOLDED BODY, AND LIGHT EMISSION BODY

This is a divisional of application Ser. No. 13/504,492, filed Apr. 27, 2012, which is the National Stage of International application no. PCT/JP2010/068957, filed Oct. 26, 2010, which claimed priority to Japanese patent application nos. 2009-247283, filed Oct. 28, 2009, and 2010-001247, filed Jan. 6, 2010, of which all of the disclosures are incorporated herein by reference in their entireties.

TECHNICAL FIELD

The present invention relates to a production method of a thermoplastic resin composition, a molded body obtained by molding a thermoplastic resin composition which is obtained by the production method, and a light emission body using the molded body.

BACKGROUND ART

It is known that some metal oxides and metal complexes emit a visible light by receiving irradiation of an ultraviolet. Using this property, the metal oxides and metal complexes are used for an optical material such as a fluorescent body. The light emission property of the metal oxide and metal complex is thought to be due to the crystal condition and an electron donor type defect in the surface (a hole of interstitial metal and oxygen). It is known that metal oxides in high crystal condition and metal oxides in the surface of which an electron donor type defect is generated emit a visible light by receiving irradiation of an ultraviolet. Also, it is known that metal complexes emit a light when it returns to the ground state from the excited state in which it is excited by receiving irradiation of an ultraviolet.

A thermoplastic resin composition containing a metal oxide is generally produced by kneading metal oxide fine particles and a thermoplastic resin, and is strongly influenced by particle diameter and aggregation state of the metal oxide fine particles. In the case where the particle diameter is large, light emission intensity is reduced or light emission is not provided. In the case where aggregation of fine particles is progressed, light emission intensity is reduced or light emission is not provided. Also, the transparency of the molded body may be compact may become lower.

In order to solve the problem, Patent document 1 proposes a production method of a thermoplastic resin composition in which an appropriate amount of the aluminum-type polymerization catalyst used at the time of polymerization is left. The molded body obtained by this method keeps transparent, and emits a visible light by receiving irradiation of an ultraviolet. However, it is difficult to control the amount of the metal oxide which exists in the molded body, and the light emission intensity is not also high.

Patent document 2 proposes a production method of a thermoplastic resin composition in which a thermoplastic resin and a metal complex is heated. The molded body obtained by this method has ultraviolet absorptivity. This molded body may emit a visible light by receiving irradiation of an ultraviolet, but the light emission intensity is not high.

PRIOR ART DOCUMENT

Patent Document

Patent document 1: JP 2008-101085 A
Patent document 2: JP 10-72552 A

SUMMARY OF THE INVENTION

Problem to be Solved by the Invention

An object of the present invention is to provide a production method of a thermoplastic resin composition and a molded body thereof, which have a good light emission property of visible light by ultraviolet irradiation.

Means of Solving the Problems

The present invention is a production method of a thermoplastic resin composition comprising: compounding 0.001 to 50 parts by mass of a metal complex (B) with respect to 100 parts by mass of a thermoplastic resin (A); and kneading it under a condition of a kneading temperature of 225 to 300° C. and of a kneading time of 0.5 to 30 minutes; wherein a metal of the metal complex (B) is a metal except for zinc.

Also, the present invention is a molded body obtained by molding a thermoplastic resin composition which is obtained by the production method.

Further, the present invention is a light emission body using the molded body.

Effect of the Invention

According to the present invention, provided is a molded body which has a good light emission property of visible light by ultraviolet irradiation. That is to say, provided is a molded body in which the wavelength of light is made long by light irradiation and in which the light emission intensity is high.

BRIEF DESCRIPTION OF DRAWINGS

The FIGURE is light emission spectra of molded bodies at an excitation wavelength of 365 nm.

MODE FOR CARRYING OUT THE INVENTION

As a thermoplastic resin (A) of the present invention, a well-known thermoplastic resin can be used. Examples thereof include, for example, acrylic resins, styrene resins, olefin resins, polycarbonate resins, polyvinyl chloride resins, polyvinylidene chloride resins, polyamide resins, polyester resins, polyacetal resins, polyphenylene ether resins, polyethylene terephthalate resins, polybutylene terephthalate resins, polyarylate resins, polyphenylene sulfide resins, polyethersulfone resins, polyetherimide resins, polyether ether ketone resins, polyether ketone resins, and fluorine resins. This thermoplastic resin (A) may be used alone, or in combination with two or more kinds.

Among these thermoplastic resins (A), acrylic resins, styrene resins, olefin resins, polycarbonate resins, polyvinyl chloride resins, and polyester resins are preferable because they are melted in a temperature range of 225 to 300° C. Acrylic resins, styrene resins, olefin resins, and polycarbonate resins are more preferable. Also, acrylic resins and polycarbonate resins are particularly preferable because the molded body and the light emission body obtained have a good light emission property.

Examples of the acrylic resin include, for example, polymethyl methacrylates (PMMA); acrylic resins obtained by copolymerization of methyl methacrylate with another monomer such as styrene, α-methyl styrene, acrylonitrile, and various acrylates or methacrylates; polymers containing various acrylates or methacrylates as a main component; and acrylic resins obtained by graft copolymerization of a polymer containing a rubber such as acrylic rubbers, silicone rubbers, and butadiene rubbers, with another monomer such as methyl methacrylate, and various acrylates or methacrylate.

Examples of the styrene resin include, for example, polystyrenes (PS), high impact polystyrenes (HIPS), methyl methacrylate-styrene copolymers (MS), methyl methacrylate-butadiene-styrene copolymers (MBS), styrene-maleic anhydride copolymers (SMA), styrene-methacrylic acid copolymers (SMAA), styrene-α-methyl styrene copolymers, styrene-maleimide copolymers, acrylonitrile-styrene copolymers, α-methyl styrene-acrylonitrile copolymers, and alloys of this styrene resin with a polyphenylene ether resin.

Examples of the acrylonitrile-styrene copolymer include, for example, acrylonitrile-styrene copolymers (SAN), acrylonitrile-styrene-butadiene copolymers (ABS), acrylonitrile-styrene-acrylic rubber copolymers (AAS), acrylonitrile-styrene-chlorinated polyethylene copolymers (ACS), acrylonitrile-styrene-ethylene-propylene rubber copolymers (AES), and acrylonitrile-styrene-ethylene-vinyl acetate copolymers. Also, acrylonitrile-α-methyl styrene copolymers in which a styrene moiety is substituted with α-methyl styrene are included.

Examples of the olefin resin include, for example, polyethylene resins such as ultralow density polyethylenes, low density polyethylenes, linear low density polyethylenes, medium density polyethylenes, and high density polyethylenes; ethylene-vinyl acetate copolymers having a vinyl acetate unit content of 0.1 to 25% by mass; ethylene-acrylic acid copolymers having an acrylic acid unit content of 0.1 to 25% by mass; polypropylenes; ethylene-propylene block copolymers having an ethylene unit content 2 to 40% by mass; ethylene-propylene random copolymers having an ethylene unit content 0.5 to 10% by mass; polybutenes; ethylene-propylene rubbers; ethylene-propylene-diene rubbers; and cycloolefin resins (COP). Among these olefin resins, cycloolefin resins (COP), low density polyethylenes, high density polyethylenes, and polypropylenes are preferable because the molded body obtained has a good mechanical property.

Examples of polyvinyl chloride resin include, for example, vinyl chloride homopolymers; copolymers obtained by copolymerization of vinyl chloride with another monomer such as ethylene, propylene, acrylonitrile, vinylidene chloride, and vinyl acetate; and modified polyvinyl chloride resins in which MBS, ABS, a nitrile rubber, a chlorinated polyethylene, an ethylene vinyl alcohol-vinyl chloride graft copolymer, or various plasticizers is added to a polyvinyl chloride.

The mass average molecular weight of a thermoplastic resin (A) is preferably 1,000 to 1,000,000, more preferably 5,000 to 800,000, and particularly preferably 10,000 to 500,000. When the mass average molecular weight of a thermoplastic resin (A) is 1,000 or more, the molded body obtained comes to have a good mechanical property. Also, when the mass average molecular weight of a thermoplastic resin (A) is 1,000,000 or less, the thermoplastic resin composition has a good moldability, whereby the metal complex decomposition product comes to be dispersed well in the molded body and the molded body obtained comes to have a high light emission intensity.

A metal complex (B) of the present invention is a compound in which a ligand is bonded to a metal except for zinc.

The kind of a metal of a metal complex (B) is any of elements which belong to Group 1 except for hydrogen, Group 2, Group 3 containing lanthanoid and actinoid, Group 4, Group 5, Group 6, Group 7, Group 8, Group 9, Group 10, Group 11, Group 12 except for zinc, Group 13 except for boron, Group 14 except for carbon, Group 15 except for nitrogen, phosphorus and arsenic, and Group 16 except for oxygen, sulfur, selenium and tellurium, in the periodic table. Examples thereof include, for example, Li, Na, K, Rb, Cs, Be, Mg, Ca, Sr, Ba, Sc, Y, La, Ce, Pr, Nd, Pm, Sm, Eu, Gd, Tb, Dy, Ho, Er, Tm, Yb, Lu, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Cd, Hg, Al, Ga, In, TI, Si, Ge, Sn, Pb, Sb, and Bi. This metal can appropriately be chosen in consideration of the light emission property of the molded body obtained. Also, this metal may be used alone, or in combination with two or more kinds.

Among these metals, Al, Ga, In, TI, Be, Dy, Eu, Sr, Yb, and Co are preferable because the molded body obtained has a good light emission property. Also, metals of Group 13 in the periodic table are more preferable because they have a high coordination number, the metal complex (B) has an excellent solubility to the thermoplastic resin (A), and the metal complex decomposition product comes to have a good dispersibility. Aluminum, gallium, and indium are further preferable, and aluminum is particularly preferable.

Examples of the kind of a ligand of a metal complex (B) include, for example, β-diketones, keto esters, hydroxy carboxylic acids or the salts thereof, various Schiff bases, keto alcohols, polyvalent amines, alkanol-amines, enol-type active hydrogen compounds, dicarboxylic acids, glycols, and ferrocenes.

Examples of the compound as a ligand of a metal complex (B) include, for example, acetylacetone, hexafluoroacetone, ethylenediamine, triethylene-diamine, ethylene tetramine, bipiperidine, cyclohexane diamine, tetraaza-cyclotetradecane, ethylenediaminetetraacetic acid, tetraethylene glycol, tartaric acid, glycine, triglycine, naphthyridine, porphyrin, thiourea, 8-hydroxy-quinoline, 8-hydroxy chinaldine, β-amino ethyl mercaptan, bisacetylacetone ethylenediimine, picolinic acid, dimethylglyoximato, dimethylglyoxime, aspartic acid, 1,2-dimethylimidazole, methionine, 2-hydroxy-6-methylpyridine, and oxalic acid. This compound may be used alone, or in combination with two or more kinds.

Among these compounds, acetylacetone, hexafluoroacetylacetone, ethylenediamine, bipiperidine, cyclohexanediamine, tetraazacyclotetra-decane, tetraethylene glycol, glycine, and triglycine are preferable because the molded body obtained has a good light emission property. Also, β-diketones such as acetylacetone and hexafluoroacetone are more preferable because the metal complex (B) has an excellent solubility to the thermoplastic resin (A), and the metal complex decomposition product has a good dispersibility, as well as because they have sublimation property and the decomposition of the metal complex (B) to the metal complex decomposition product is accelerated. Acetylacetone and hexafluoroacetone are further preferable.

As the metal complex (B), aluminum acetylacetonate, aluminum hexafluoroacetylacetonate, gallium acetylacetonate, gallium hexafluoro-acetylacetonate, indium acetylacetonate, indium hexafluoroacetylacetonate, thallium acetylacetonate, thallium hexafluoroacetylacetonate, cobalt acetylacetonate, and cobalt hexafluoroacetylacetonate are preferable because they have sublimation property and the decomposition to the metal complex decomposition product is accelerated. Also, aluminum acetyl-acetonate, aluminum hexafluoroacetylacetonate, gallium acetylacetonate, gallium hexafluoroacetylacetonate, indium acetylacetonate, and indium hexafluoroacetylacetonate are more preferable because they have a high coordination number, the metal complex (B) has an excellent solubility to the thermoplastic resin (A), and the metal complex decomposition product comes to have a good dispersibility. Aluminum acetylacetonate, gallium acetyl-acetonate, and indium acetylacetonate are particularly preferable.

Further, aluminum acetylacetonate is most preferable because the molded body obtained comes to have a good light emission intensity.

This metal complex (B) may be used alone, or in combination with two or more kinds.

A thermoplastic resin composition is obtained by compounding a thermoplastic resin (A) and a metal complex (B).

The compounding amount of a metal complex (B) is 0.001 to 50 parts by mass, preferably 0.01 to 20 parts by mass, and more preferably 0.1 to 10 parts by mass, with respect to 100 parts by mass of a thermoplastic resin (A). When the compounding amount of a metal complex (B) is 0.001 part by mass or more, the molded body obtained comes to have a high light emission intensity. Also, when the compounding amount of a metal complex (B) is 50 parts by mass or less, processing of a gas produced by the decomposition of a metal complex (B) at the time of heating comes to be easy.

Examples of the compounding method include for example, but should not be limited to, a method in which a pellet of the thermoplastic resin (A) and a powder of the metal complex (B) are compounded, a method in which a powder of the thermoplastic resin (A) and a powder of the metal complex (B) are compounded, and a method in which a melted body of the thermoplastic resin (A) and a powder of the metal complex (B) are compounded. Among these methods, a method in which a melted body of the thermoplastic resin (A) and a powder of the metal complex (B) are compounded is preferable because the metal complex decomposition product in the molded body comes to have a good dispersibility, and the molded body obtained comes to have a high light emission intensity.

If needed, an additive such as a plasticizer, a lubricant, a stabilizer, an oxidant inhibitor, an ultraviolet absorber, or a mold release agent besides a thermoplastic resin (A) and a metal complex (B) may be compounded to the thermoplastic composition of the present invention.

A thermoplastic resin composition of the present invention is obtained by kneading it under a condition of a kneading temperature of 225 to 300° C. and of a kneading time of 0.5 to 30 minutes. The kneading of the thermoplastic resin composition of the present invention under the condition results in the decomposition of the metal complex (B) to obtain a decomposition product of the metal complex in the thermoplastic resin (A). Note that, the decomposition of the metal complex (B) by the kneading process includes not only a case in which the whole amount of the metal complex (B) is decomposed, but also includes a case in which a portion of the metal complex (B) is left without decomposition and is left in a modified form.

A kneading temperature of the present invention is 225 to 300° C. The kneading temperature can appropriately be set in the range of 225 to 300° C. in consideration of the melting temperature of the thermoplastic resin (A) and the decomposition temperature of the metal complex (B). For example, in the case where an acrylic resin or a styrene resin is used as the thermoplastic resin (A), it is preferably 240 to 290° C. because of the melting temperature of the thermoplastic resin (A) and because the decomposition of the metal complex (B) is accelerated.

When the kneading temperature is lower than 225° C., the decomposition of the metal complex (B) progresses slowly and does not come to have a high light emission intensity because of the low heat history. Also, when the kneading temperature is 300° C. or less, the amount of the decomposition of the thermoplastic resin (A) is small and the natural property of the thermoplastic resin (A) is not damaged.

A kneading time of the present invention is 0.5 to 30 minutes. The kneading time can appropriately be set in the range of 0.5 to 30 minutes in consideration of the decomposition progress of the metal complex (B). For example, in the case where acetylacetone is used as the ligand of the metal complex (B), it is preferably 1 to 30 minutes because the decomposition of the metal complex (B) is accelerated.

When the kneading time is 0.5 minutes or more, the decomposition of the metal complex (B) is accelerated and the molded body obtained comes to have a high light emission intensity. When the kneading time is 30 minutes or less, the amount of the decomposition of the thermoplastic resin (A) is small, the natural property of the thermoplastic resin (A) is not damaged, the light emission wavelength further becomes a long wavelength, and the light emission intensity becomes high.

Although the kneading temperature of the present invention is 225 to 300° C. and the kneading time of the present invention is 0.5 to 30 minutes, in the case where the kneading temperature is 225 to 250° C., the kneading time is preferably 5 to 30 minutes to obtain a good light emission property. Also, in the case where the kneading temperature is 250 to 300° C., the kneading time can appropriately be set in the range of 0.5 to 30 minutes because a good light emission property can be obtained even if the kneading time is 0.5 to 5 minutes.

As for an atmosphere during the kneading, it is preferable to avoid an oxidizing atmosphere and to knead it under an inert atmosphere such as nitrogen because the amount of the decomposition of the thermoplastic resin (A) comes to be small.

As a kneading apparatus, a well-known kneading apparatus can be used. Examples thereof include, for example, single-screw extruders, multi-screw extruders having two or more screws, bumbary mixers, kneaders, and rolls. Among these kneading apparatuses, single-screw extruders and multi-screw extruders having two or more screws are preferable because the metal complex decomposition product in the molded body comes to have a good dispersibility, and the molded body obtained comes to have a high light emission intensity.

Examples of the kneading method in the case where an extruder is used as the kneading apparatus include, for example, a method in which a thermoplastic resin (A) and a metal complex (B) are loaded from a raw material loading hopper at an upstream position, and they are kneaded; and a method in which a thermoplastic resin (A) are preliminarily melted and a metal complex (B) or a metal complex (B) diluted in an organic solvent are injected from a middle of an extruder, and they are kneaded. Also, a method in which a masterbatch containing a thermoplastic resin (A) and a metal complex (B) at a high concentration is produced and thereafter the masterbatch and the thermoplastic resin (A) are kneaded to adjust a final concentration can be used. Note that, a gas or the like generated by the decomposition of the metal complex (B) can be removed by vacuum devolatization using a vent port provided in the apparatus. The thermoplastic resin composition obtained can be pelletized to be used as a molding material.

A molded body of the present invention can be obtained by molding a thermoplastic resin composition of the present invention.

As for a molding method, a well-known molding method can be used. Examples thereof include, for example, injection molding, extrusion molding, blow molding, inflation molding, vacuum molding, compression molding, and foaming molding. Also, after having molded as a film, a biaxially-drawn film, a sheet, a foamed sheet, a foamed bead, or the like, it can be molded as a desired molded body.

A molded body and a light emission body of the present invention have an excellent light emission property, and a practically sufficient light emission can be obtained even if an excitation light source having a low energy such as a black light is used. Examples of the black light include, for example, a black light having a peak wavelength of around 350 nm. Also, a visible light having a peak wavelength of around 400 nm may be used as a light source.

A molded body and a light emission body of the present invention enable a conversion of an ultraviolet to visible light wavelength and a control of electroconductivity by the band gap control. Therefore, they are expected to be applied in an optical material field or an electronic material field as a topsheet or a sealant of solar cell, a member for organic electroluminescence, a member for liquid crystal, a member for lighting, or the like, and in an agricultural material field as a wavelength conversion sheet.

EXAMPLE

As follows, the present invention is described by Examples, but the present invention is not limited to these Examples. Note that, in the Examples, "part(s)" represents "part(s) by mass". The evaluation of each property shown in the Examples was carried out by a method shown below.

(1) Measurement of Transmittance

The transmittance of the molded body obtained (10 mm×20 mm×1.5 mm) was measured in the wavelength range of 250 to 800 nm using a spectrophotometer (model name: "U-3300", made by Hitachi, Ltd.). The values of the transmittances at the wavelengths of 400, 500, and 800 nm are shown in Table 1.

(2) Measurement of Light Emission Color

The molded body obtained (10 mm×20 mm×1.5 mm) was irradiated with an ultraviolet having a peak wavelength of 365 nm using an ultraviolet lamp (model name: "handy UV lamp SLUV-4", made by AS ONE Corporation, irradiation intensity at 50 nm distance from a light source: 743 µW/cm$^2$ (365 nm)) as a light source, and the visual light emission color was observed under the illuminance of 0 lux (dark place). Note that, the illuminance was measured using an illuminometer (model name "ANA-F9", made by TOKYO KODEN Co., Ltd.).

(3) Measurement of Light Emission Peak Wavelength

The surface (10 mm×20 mm) of the molded body obtained (10 mm×20 mm×1.5 mm) was irradiated with an ultraviolet having a peak wavelength of 365 nm using an ultraviolet lamp (model name: "handy UV lamp SLUV-4", made by AS ONE Corporation, irradiation intensity at 50 nm distance from a light source: 743 µW/cm$^2$ (365 nm)) as a light source, and the light emission peak wavelength of light released from the side surface (10 mm×1.5 mm) of the molded body was measured with an optical thin film measurement apparatus (model name: "FilmTek 1000", made by Scientific Computing Int.) as a detector. As for the positions of the molded body, the light source and the detector, the detector was placed at an angle of 90° to the optical axis of the light source, the distance from the light source to the molded body was 30 cm, and the distance from the molded body to the detector was 5 cm. Note that, in the FIGURE, the horizontal axis shows wavelength and the vertical axis shows light emission relative intensity.

(1) Measurement of Quantum Yield

The surface (10 mm×20 mm) of the molded body obtained (10 mm×20 mm×1.5 mm) was set in an integrating sphere of an absolute quantum yield measuring apparatus (model name: "PE-1100", made by Otsuka Electronics Co., Ltd.), and an excitation light was selected at 10 nm interval from a range of excitation wavelength of 300 to 410 nm, and a light emission spectrum thereat was measured. From the data obtained, the internal quantum yield and the external quantum yield were evaluated. The internal quantum yield was calculated by dividing the number of light emission photons of the molding body by the number of photons absorbed in the molded body among the excitation light irradiated thereto. The external quantum yield was calculated by dividing the number of light emission photons of the molding body by the number of photons of the irradiated excitation light.

Example 1

100 parts of polymethyl methacrylate (trade name: "VHK", made by Mitsubishi Rayon Co., Ltd.) as a thermoplastic resin (A) and 2.5 parts of aluminum acetylacetonate as a metal complex (B) were loaded into a small injection molding machine (model name: "CS-183MMX", made by Custom Scientific Instruments Inc.), and it was kneaded at a temperature of 270° C. for 1 minute to obtain a pellet.

The pellet obtained was again loaded into the small injection molding machine, and it was kneaded at a temperature of 220° C. for 1 minute, and thereafter a molded body of 10 mm×20 mm×2 mm was obtained. Mirror polishing was conducted to the surface of this molded body of 10 mm×20 mm×2 mm with a polishing machine (model name: "5629 type", made by Marumoto Kogyo, Co., Ltd.), to obtain a molded body of 10 mm×20 mm×1.5 mm. Note that, the evaluations of the molded body obtained were conducted using the polished molded body of 10 mm×20 mm×1.5 mm.

Examples 2 to 17 and Comparative Examples 1 to 11

Molded bodies were obtained in the same manner as in Example 1 except that the kind of the thermoplastic resin (A), the kind and compounding amount of the metal complex (B), the kneading temperature, and the kneading time were changed as shown in Tables 1 to 3.

The light emission properties of molded bodies obtained in Examples 1 to 17 and Comparative Examples 1 to 11 are shown in Tables 1 to 3. Also, the light emission spectra of molded bodies obtained in Example 3 and Comparative Example 3 are shown in the FIGURE.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Thermoplastic Resin (A) | Kind | PMMA | PMMA | PMMA | PMMA | PMMA | PMMA | PMMA | PMMA | PMMA | PMMA |
|  | [part] | 100 | 100 | 100 | 100 | 100 | 100 | 100 | 100 | 100 | 100 |
| Metal Complex (B) | Kind | Al(Acac)$_3$ | Al(Acac)$_3$ | Al(Acac)$_3$ | Al(Acac)$_3$ | Al(Acac)$_3$ | Al(Acac)$_3$ | Al(Acac)$_3$ | Al(Acac)$_3$ | Al(Acac)$_3$ | Al(Acac)$_3$ |
|  | [part] | 2.5 | 2.5 | 2.5 | 2.5 | 2.5 | 2.5 | 2.5 | 2.5 | 0.5 | 5 |
| Kneading Temperature [° C.] |  | 270 | 270 | 270 | 270 | 250 | 250 | 230 | 230 | 270 | 270 |
| Kneading Time [min] |  | 1 | 3 | 5 | 20 | 5 | 15 | 5 | 25 | 5 | 5 |
| Molding Temperature [° C.] |  | 220 | 220 | 220 | 220 | 220 | 220 | 220 | 220 | 220 | 220 |
| Transmittance [%] | 400 nm | 86 | 73 | 38 | 15 | 65 | 55 | 81 | 57 | 88 | 48 |
|  | 500 nm | 92 | 91 | 89 | 90 | 90 | 91 | 89 | 91 | 91 | 89 |
|  | 800 nm | 92 | 92 | 91 | 91 | 92 | 91 | 90 | 92 | 91 | 92 |
| Light Emission Color |  | Blue~Green | Blue~Green | Blue~Green | Blue~Green | Blue~Green | Blue~Green | Blue~Green | Blue~Green | Blue~Green | Blue~Green |
| Light Emission Peak Wavelength [nm] |  | 482 | 482 | 482 | 482 | 482 | 482 | 405 | 482 | 405 | 482 |
| External Quantum Yield [%] | Excitation Wavelength [nm] 300 | 0 | 0 | 0 | 0 | 0 | 0 | 0 | 0 | 0 | 0 |
|  | 310 | 0 | 0 | 0 | 0.5 | 0 | 0 | 0 | 0 | 0 | 0 |
|  | 320 | 0.5 | 0 | 2.2 | 3.0 | 1.0 | 3.5 | 0 | 2.3 | 0 | 2.6 |
|  | 330 | 2.4 | 5.3 | 8.9 | 6.8 | 6.5 | 12.1 | 3.7 | 11.2 | 1.6 | 10.2 |
|  | 340 | 4.6 | 6.6 | 17.3 | 7.1 | 11.9 | 20.4 | 9.0 | 19.8 | 3.4 | 16.3 |
|  | 350 | 8.6 | 10.9 | 24.0 | 17.0 | 18.9 | 26.6 | 15.5 | 25.5 | 6.1 | 21.4 |
|  | 360 | 12.8 | 16.4 | 27.7 | 20.1 | 24.1 | 29.9 | 20.7 | 29.1 | 8.9 | 22.4 |
|  | 370 | 15.5 | 19.3 | 27.8 | 19.0 | 25.1 | 28.2 | 21.4 | 27.7 | 10.6 | 21.9 |
|  | 380 | 10.0 | 14.5 | 26.8 | 18.9 | 23.9 | 28.8 | 20.3 | 27.0 | 9.6 | 21.5 |
|  | 390 | 4.5 | 5.7 | 18.8 | 19.5 | 16.0 | 26.0 | 10.4 | 24.9 | 7.0 | 20.3 |
|  | 400 | 2.8 | 6.4 | 19.3 | 23.3 | 12.3 | 25.5 | 7.9 | 24.6 | 5.1 | 24.9 |
|  | 410 | 2.0 | 4.2 | 17.7 | 25.7 | 10.9 | 25.3 | 7.0 | 22.2 | 3.5 | 26.0 |
| Internal Quantum Yield [%] | Excitation Wavelength [nm] 300 | 0 | 0 | 0 | 0 | 0 | 0 | 0 | 0 | 0 | 0 |
|  | 310 | 0 | 0 | 0 | 0.5 | 0 | 0 | 0 | 0 | 0 | 0 |
|  | 320 | 0.5 | 0 | 2.4 | 3.2 | 1.0 | 3.7 | 0 | 2.4 | 0 | 2.8 |
|  | 330 | 3.1 | 7.6 | 9.4 | 7.2 | 6.8 | 12.8 | 4.0 | 11.8 | 2.9 | 10.8 |
|  | 340 | 6.5 | 9.4 | 18.1 | 7.5 | 12.6 | 21.4 | 9.5 | 20.8 | 6.8 | 17.1 |
|  | 350 | 12.1 | 15.3 | 25.1 | 17.8 | 19.9 | 28.0 | 16.3 | 26.8 | 12.5 | 22.5 |
|  | 360 | 18.4 | 23.0 | 29.1 | 21.1 | 25.4 | 31.3 | 21.9 | 30.6 | 18.0 | 23.5 |
|  | 370 | 22.8 | 27.1 | 29.0 | 20.0 | 26.6 | 29.8 | 22.7 | 29.3 | 21.7 | 23.2 |
|  | 380 | 20.0 | 26.6 | 28.7 | 20.0 | 25.8 | 30.7 | 22.1 | 28.9 | 25.4 | 22.9 |
|  | 390 | 16.8 | 25.1 | 28.0 | 20.6 | 24.0 | 28.6 | 14.7 | 27.6 | 27.0 | 21.7 |
|  | 400 | 15.2 | 28.1 | 28.2 | 24.5 | 22.0 | 33.4 | 15.6 | 32.8 | 27.5 | 29.3 |
|  | 410 | 13.4 | 24.3 | 29.6 | 27.2 | 23.7 | 37.7 | 16.8 | 34.7 | 26.0 | 33.1 |

TABLE 2

|  |  | Ex. 11 | Ex. 12 | Ex. 13 | Ex. 14 | Ex. 15 | Ex. 16 | Ex. 17 |
|---|---|---|---|---|---|---|---|---|
| Thermoplastic Resin (A) | Kind | PMMA | PMMA | PMMA | PS | ARTON | ZEONOR | PC |
|  | [part] | 100 | 100 | 100 | 100 | 100 | 100 | 100 |
| Metal Complex (B) | Kind | Al(6FAcac)$_3$ | Ga(Acac)$_3$ | In(Acac)$_3$ | Al(Acac)$_3$ | Al(Acac)$_3$ | Al(Acac)$_3$ | Al(Acac)$_3$ |
|  | [part] | 2.5 | 5 | 5 | 2.5 | 2.5 | 2.5 | 2.5 |
| Kneading Temperature [° C.] |  | 270 | 270 | 270 | 270 | 270 | 270 | 270 |
| Kneading Time [min] |  | 5 | 5 | 5 | 5 | 5 | 5 | 5 |
| Molding Temperature [° C.] |  | 220 | 220 | 220 | 220 | 220 | 220 | 220 |
| Transmittance [%] | 400 nm | 74 | 34 | 11 | 55 | 29 | 63 | 8 |
|  | 500 nm | 90 | 64 | 43 | 73 | 72 | 82 | 74 |
|  | 800 nm | 92 | 81 | 73 | 82 | 89 | 87 | 86 |
| Light Emission Color |  | Blue | Green | Green | Blue | Blue | Blue | Blue~Green |
| Light Emission Peak Wavelength [nm] |  | 421 | 496 | 508 | 408 | 408 | 408 | 497 |
| External Quantum Yield [%] | Excitation Wavelength [nm] 300 | 0 | 0 | 0 | 0 | 0 | 0 | 0 |
|  | 310 | 0 | 0 | 0 | 0 | 0 | 0 | 0 |
|  | 320 | 1.1 | 0 | 0 | 0 | 0.5 | 0 | 0 |
|  | 330 | 6.3 | 0.1 | 0 | 1.9 | 1.1 | 0.6 | 0.4 |
|  | 340 | 13.3 | 0.3 | 0 | 4.0 | 2.0 | 1.6 | 2.0 |
|  | 350 | 19.5 | 0.5 | 0 | 8.7 | 3.4 | 4.3 | 3.8 |
|  | 360 | 24.4 | 1.5 | 0 | 15.8 | 4.5 | 7.5 | 5.9 |
|  | 370 | 24.6 | 1.8 | 0.2 | 19.8 | 3.4 | 8.8 | 5.7 |
|  | 380 | 24.4 | 3.5 | 0.5 | 19.0 | 4.0 | 7.4 | 8.0 |
|  | 390 | 19.3 | 3.3 | 0.6 | 8.1 | 2.6 | 0.7 | 6.6 |
|  | 400 | 16.5 | 3.2 | 0.6 | 4.3 | 2.4 | 1.6 | 11.0 |
|  | 410 | 14.3 | 2.5 | 0.5 | 5.3 | 2.7 | 1.4 | 13.3 |
| Internal Quantum Yield [%] | Excitation Wavelength [nm] 300 | 0 | 0 | 0 | 0 | 0 | 0 | 0 |
|  | 310 | 0 | 0 | 0 | 0 | 0 | 0 | 0 |
|  | 320 | 1.1 | 0 | 0 | 0 | 0.5 | 0 | 0 |
|  | 330 | 6.7 | 0.1 | 0 | 2.0 | 1.2 | 0.6 | 0.4 |
|  | 340 | 14.0 | 0.3 | 0 | 4.3 | 2.1 | 1.7 | 2.1 |

TABLE 2-continued

|  | Ex. 11 | Ex. 12 | Ex. 13 | Ex. 14 | Ex. 15 | Ex. 16 | Ex. 17 |
|---|---|---|---|---|---|---|---|
| 350 | 20.5 | 0.6 | 0 | 9.3 | 3.6 | 4.7 | 4.0 |
| 360 | 25.7 | 1.6 | 0 | 17.0 | 4.8 | 8.4 | 6.2 |
| 370 | 26.0 | 2.0 | 0.2 | 21.4 | 3.6 | 9.8 | 6.0 |
| 380 | 26.1 | 4.0 | 0.6 | 21.4 | 4.3 | 9.1 | 8.5 |
| 390 | 23.1 | 4.2 | 0.6 | 12.5 | 2.9 | 1.1 | 7.0 |
| 400 | 27.0 | 4.9 | 0.7 | 10.5 | 2.8 | 3.0 | 11.8 |
| 410 | 27.6 | 4.3 | 0.6 | 15.8 | 3.3 | 2.9 | 14.9 |

TABLE 3

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 1 |
|---|---|---|---|---|---|---|---|---|---|---|---|---|---|
| Thermoplastic Resin (A) | Kind | | PMMA | PMMA | PMMA | PMMA | PMMA | PMMA | PMMA | PMMA | PMMA | PMMA | PMMA |
|  | [part] | | 100 | 100 | 100 | 100 | 100 | 100 | 100 | 100 | 100 | 100 | 100 |
| Metal Complex (B) | Kind | | Al | Al | Al | Al | Al | Al | Al | Al | Al | — | Zn |
|  | [part] | | (Acac)$_3$ 2.5 | (Acac)$_3$ 2.5 | (Acac)$_3$ 2.5 | (Acac)$_3$ 2.5 | (Acac)$_3$ 2.5 | (Acac)$_3$ 2.5 | (Acac)$_3$ 2.5 | (Acac)$_3$ 2.5 | (Acac)$_3$ 2.5 | 0 | (Acac)$_2$ 2.5 |
| Kneading Temperature [° C.] | | | 220 | 220 | 220 | 200 | 180 | 270 | 250 | 230 | 220 | 270 | 270 |
| Kneading Time [min] | | | 1 | 3 | 5 | 5 | 5 | 0.33 | 0.33 | 0.33 | 0.33 | 5 | 5 |
| Molding Temperature [° C.] | | | 220 | 220 | 220 | 220 | 220 | 220 | 220 | 220 | 220 | 220 | 220 |
| Transmittance [%] | 400 nm | | 85 | 88 | 84 | 82 | 82 | 85 | 84 | 88 | 88 | 88 | 1 |
|  | 500 nm | | 88 | 91 | 89 | 89 | 88 | 91 | 90 | 91 | 92 | 90 | 7 |
|  | 800 nm | | 90 | 92 | 90 | 90 | 89 | 91 | 91 | 91 | 92 | 91 | 44 |
| Light Emission Color | | | Blue | Blue | Blue | Blue | Blue | Blue | Blue | Blue | Blue | None | Green |
| Light Emission Peak Wavelength [nm] | | | 405 | 405 | 405 | 405 | 405 | 405 | 405 | 405 | 405 | なし | 511 |
| External Quantum Yield [%] | Excitation Wavelength [nm] | 300 | 0 | 0 | 0 | 0 | 0 | 0 | 0 | 0 | 0 | 0 | 0 |
|  |  | 310 | 0 | 0 | 0 | 0 | 0 | 0 | 0 | 0 | 0 | 0 | 0 |
|  |  | 320 | 0 | 0 | 0 | 0 | 0 | 0 | 0 | 0 | 0 | 0 | 0 |
|  |  | 330 | 1.3 | 2.9 | 1.7 | 0.8 | 0.4 | 2.3 | 0.4 | 0 | 0 | 0 | 0 |
|  |  | 340 | 3.0 | 7.0 | 4.6 | 3.3 | 1.8 | 9.9 | 4.3 | 1.3 | 1.3 | 0 | 0 |
|  |  | 350 | 5.6 | 12.9 | 8.3 | 5.7 | 4.0 | 20.3 | 10.5 | 2.8 | 4.0 | 0 | 0 |
|  |  | 360 | 8.3 | 21.2 | 14.0 | 8.8 | 5.7 | 31.9 | 20.8 | 8.3 | 7.1 | 0 | 0 |
|  |  | 370 | 9.0 | 11.7 | 15.7 | 9.3 | 6.2 | 34.9 | 24.8 | 10.1 | 11.1 | 0 | 0 |
|  |  | 380 | 5.1 | 17.5 | 9.0 | 5.4 | 3.1 | 31.7 | 22.8 | 12.0 | 11.8 | 0 | 1.3 |
|  |  | 390 | 1.6 | 6.6 | 2.5 | 0.4 | 0.4 | 13.4 | 7.8 | 0 | 0 | 0 | 4.7 |
|  |  | 400 | 0.7 | 4.3 | 1.8 | 1.1 | 0.1 | 12.7 | 6.8 | 0 | 0 | 0 | 5.9 |
|  |  | 410 | 1.2 | 2.2 | 1.2 | 0.5 | 0.5 | 8.4 | 3.1 | 0 | 0 | 0 | 5.6 |
| Internal Quantum Yield [%] | Excitation Wavelength [nm] | 300 | 0 | 0 | 0 | 0 | 0 | 0 | 0 | 0 | 0 | 0 | 0 |
|  |  | 310 | 0 | 0 | 0 | 0 | 0 | 0 | 0 | 0 | 0 | 0 | 0 |
|  |  | 320 | 0 | 0 | 0 | 0 | 0 | 0 | 0 | 0 | 0 | 0 | 0 |
|  |  | 330 | 1.6 | 3.4 | 1.9 | 1.0 | 0.5 | 2.3 | 0.4 | 0 | 0 | 0 | 0 |
|  |  | 340 | 4.9 | 9.2 | 5.7 | 5.7 | 3.7 | 9.9 | 4.3 | 1.3 | 1.3 | 0 | 0 |
|  |  | 350 | 10.1 | 17.1 | 11.0 | 11.2 | 10.2 | 20.3 | 10.5 | 2.8 | 4.1 | 0 | 0 |
|  |  | 360 | 17.6 | 29.1 | 20.4 | 21.3 | 19.3 | 31.9 | 20.8 | 8.3 | 7.1 | 0 | 0 |
|  |  | 370 | 21.2 | 21.5 | 24.6 | 25.6 | 24.9 | 34.9 | 24.8 | 10.1 | 11.1 | 0 | 0 |
|  |  | 380 | 17.9 | 32.2 | 19.8 | 23.5 | 19.3 | 31.7 | 22.8 | 12.0 | 11.8 | 0 | 1.5 |
|  |  | 390 | 9.6 | 26.0 | 9.7 | 3.3 | 4.8 | 13.4 | 7.8 | 0 | 0 | 0 | 5.8 |
|  |  | 400 | 5.3 | 29.2 | 9.4 | 13.3 | 1.8 | 12.7 | 6.8 | 0 | 0 | 0 | 7.5 |
|  |  | 410 | 11.5 | 23.7 | 7.1 | 7.8 | 9.0 | 8.4 | 3.1 | 0 | 0 | 0 | 7.3 |

Note that, the abbreviations described in Tables 1 to 3 represent the following compounds.
PMMA: polymethyl methacrylate (trade name: "VHK", made by Mitsubishi Rayon Co., Ltd.)
PS: polystyrene (trade name: "Toyo styrol G200C", made by Toyo Stylene Co., Ltd.)
ARTON: cycloolefin resin (trade name: "ARTON", made by JSR Corporation)
ZEONOR: cycloolefin resin (trade name: "ZEONOR 1420R", made by Zeon Corporation)
PC: polycarbonate resin (trade name: "Panlite L-1250WP", made by Teijin Chemicals Ltd.)
Al(Acac)$_2$: aluminum acetylacetonate
Al(6FAcac)$_2$: aluminum hexafluoroacetylacetonate
Ga(Acac)$_2$: gallium acetylacetonate
In(Acac)$_2$: indium acetylacetonate
Zn(Acac)$_2$: zinc acetylacetonate As is clear from Tables 1 to 3, the molded bodies obtained in Examples 1 to 17 had a high light emission intensity. The molded bodies obtained in Comparative Examples 1 to 9, in which the kneading temperature and/or the kneading time is lower than the range of the present invention, had a low light emission intensity. The molded body obtained in Comparative Example 10, in which no metal complex (B) was compounded, did not emit light. The molded body obtained in Comparative Example 11, in which a metal complex except for the metal complex of the present invention was used, had a low quantum yield and a low light emission intensity. Further, the transmittances thereof at the visible light range were low.

INDUSTRIAL APPLICABILITY

A molded body and a light emission body of the present invention enable a conversion of an ultraviolet to visible light wavelength and a control of electroconductivity by the band gap control, and are expected to be applied in an optical material field or an electronic material field, such as a solar cell, an organic electroluminescence, a liquid crystal, and the like.

What is claimed is:

1. A method for production of a thermoplastic resin composition, the method comprising:
   compounding a thermoplastic acrylic resin (A) and from 2.5 to 5 parts by mass of a metal complex (B) with respect to 100 parts by mass of the thermoplastic acrylic resin (A), thereby forming a mixture, and
   kneading the mixture at a temperature of from 225 to 300° C. for form 0.5 to 30 minutes,
   wherein a metal of the metal complex (B) is aluminum and zinc is excluded,
   wherein the thermoplastic acrylic resin (A) is polymethyl methacrylate (PMMA), and
   wherein the metal complex (B) is at least one complex selected from the group consisting of aluminum acetylacetonate and aluminum hexafluoroacetylacetonate.

2. The method according to claim 1, wherein the thermoplastic resin composition further comprises at least one additive selected from the group consisting of a plasticizer, a lubricant, a stabilizer, an oxidant inhibitor, an ultraviolet absorber, and a mold release agent.

3. The method according to claim 1, wherein the mixture is kneaded at the temperature of from 240 to 290° C.

4. The method according to claim 1, wherein the metal complex (B) is aluminum hexafluoroacetylacetonate.

5. The method according to claim 1, wherein the metal complex (B) is aluminum acetylacetonate.

* * * * *